United States Patent
Chang

(10) Patent No.: US 8,858,057 B2
(45) Date of Patent: Oct. 14, 2014

(54) ASYMMETRIC PRISM STRUCTURE, LIGHT GUIDE PLATE, BACKLIGHT MODULE, AND APPLICATION

(75) Inventor: Kuangyao Chang, Shenzhen (CN)

(73) Assignee: Shenzhen China Star Optoelectronics Technology Co., Ltd, Shenzhen, Guangdong (CN)

(*) Notice: Subject to any disclaimer, the term of this patent is extended or adjusted under 35 U.S.C. 154(b) by 202 days.

(21) Appl. No.: 13/583,227

(22) PCT Filed: Jul. 12, 2012

(86) PCT No.: PCT/CN2012/078530
§ 371 (c)(1),
(2), (4) Date: Sep. 7, 2012

(87) PCT Pub. No.: WO2014/000324
PCT Pub. Date: Jan. 3, 2014

(65) Prior Publication Data
US 2014/0003085 A1 Jan. 2, 2014

(30) Foreign Application Priority Data
Jun. 28, 2012 (CN) .......................... 2012 1 0218685

(51) Int. Cl.
*F21V 8/00* (2006.01)
*F21S 8/10* (2006.01)
*G02B 5/04* (2006.01)

(52) U.S. Cl.
CPC ........... *G02B 6/0036* (2013.01); *F21S 48/1241* (2013.01); *G02B 5/045* (2013.01)
USPC .......................................... 362/620; 362/617

(58) Field of Classification Search
CPC .. G02B 6/0016; G02B 6/0038; G02B 6/0053; G02B 6/0036; G02B 5/045; F21S 48/1241; F21V 5/005
USPC .................. 362/617, 619, 620, 339; 359/625
See application file for complete search history.

(56) References Cited

U.S. PATENT DOCUMENTS

| | | | | |
|---|---|---|---|---|
| 6,222,689 B1* | 4/2001 | Higuchi et al. | ............... | 359/837 |
| 7,199,932 B2* | 4/2007 | Sugiura | ............... | 359/625 |
| 2006/0250818 A1* | 11/2006 | Tsuda | ............... | 362/607 |
| 2010/0309551 A1* | 12/2010 | Whitney | ............... | 359/496 |

FOREIGN PATENT DOCUMENTS

| | | |
|---|---|---|
| CN | 1836178 A | 9/2006 |
| CN | 102413349 A | 4/2012 |

* cited by examiner

*Primary Examiner* — Peggy Neils
(74) *Attorney, Agent, or Firm* — Andrew C. Cheng

(57) ABSTRACT

The asymmetric prism structure contains multiple asymmetric prisms arranged in parallel where each asymmetric prism has a first slant face, a second slant face, and a bottom face, connected end-to-end together. The first slant face directs light beams propagating perpendicular to the prism direction to a lateral side, and the second slant face directs light beams propagating perpendicular to the prism direction to the other lateral side. The present invention further provides a light guide plate, a backlight module, and a related application utilizing the asymmetric prism structure. When vertical asymmetry is present in the timing sequences for the backlight scanning and the signal to the LCD panel, the asymmetric prism structure can reduce the cross-talk near a side from the error signal, thereby enhancing the video quality.

6 Claims, 4 Drawing Sheets

ASYMMETRIC PRISM STRUCTURE, LIGHT GUIDE PLATE, BACKLIGHT MODULE, AND APPLICATION

BACKGROUND OF THE INVENTION

1. Field of the Invention

The present invention relates to the field of liquid crystal displaying techniques, and in particular to an asymmetric prism structure, a light guide plate, a backlight module, and a related application.

2. The Related Arts

The so-called shutter glasses 3D display technique is the most popular solution by recent 3D LCD TVs. This technique displays images respectively for the left and right eyes by partitioning backlight blinking. Then, with synchronously blinking glasses, the left and right eyes perceive different images, thereby achieving stereoscopic visual effect. More specifically, this technique involves delivering the frame signals for the left and right eyes alternately to the LCD panel, driving the LCD panel to display the images for the left and right eyes, and, together with the scanning of the backlight module and the time-synchronized shutter glasses, making the viewer to perceive the images for the left and right eyes as a single 3D image.

The 3D LCD display has a disadvantage. Since the LCD panel requires a backlight module to provide illumination, the partitioning of the backlight cannot be too fine. FIG. 1 is a schematic diagram showing the partitioned illumination and leakage of an edge-lit LED backlight. The edge-lit LED backlight is to arrange LED dies along the circumference of a LCD panel. Then the light emitted from the edge of the LCD panel is delivered to the center of the LCD panel through a light guide plate so as to provide the required illumination to present the image on the LCD panel. The edge-lit LED backlight has two advantages. One is that fewer LED dies are required and as such cost is reduced. The other one is that the thickness of the LCD panel can be reduced as the LED module is at the side, not in the back.

As illustrated in FIG. 1, a backlight partition 11 is lit from the right side of the LCD panel. When the backlight partition 11 is lit, the light leaks into partitions 12 and 13, and, as the light travels farther, the leakage is more serious. The leakage would cause interference between the signals for the left and right eyes. In other words, the left eye would perceive the signal for the right eye or vice versa. The interference results in a blurred image as the two signals are distributed spatially apart. The degree of blur is measured by cross-talk. A greater cross-talk means a greater interference between the left- and right-eye signals. Therefore, a major R&D topic is to reduce cross-talk so as to maintain product competitiveness.

The problem of cross-talk between the left- and right-eye signals is inherent in the shutter glasses 3D display technique. According to the shutter glasses 3D display technique, the backlight module is separated vertically into an even number of backlight partitions. The time and duration of illuminating each backlight partition is controlled in accordance with the top-down image scanning. The image signal (for left or right eye) provides the driving voltage sequentially from top to bottom to the rows of pixels of the LCD panel. Under the charge of the driving voltage, the pixels of the LCD panel start to respond. Due to the design of the pixel and the viscosity of liquid crystal, a period of response time is required before the liquid crystal reach a steady state. Due to the required response time of the liquid crystal, images are scanned onto the LCD panel also by partitions. When the image signal for a partition of the LCD panel is scanned, a corresponding backlight partition is lit while the other backlight partitions are turned off. Due to the leakage described above, when the light of a backlight partition for a left-eye signal leaks to an adjacent backlight partition for a right-eye signal (or vice versa), the eye would perceive both left- and right-eye images (i.e., the cross-talk). The left- or right-eye signal causing the cross-talk is referred as error signal (or cross-talk signal).

FIGS. 2A and 2B are schematic diagrams showing the illumination of the backlight partitions of an existing 46-inch single-shorter-edge-lit LED TV. The backlight module 20 is usually separated into an even-numbered (e.g., 4) backlight partitions. When a topmost backlight partition 21 is lit, the backlight leaks to a lower backlight partition. When a middle backlight partition 22 is lit, the backlight leaks to both an upper backlight partition and a lower backlight partition.

FIG. 3 is a schematic diagram showing the measurement of cross-talk at 9 points on a LCD panel. As illustrated, the horizontal and vertical dimensions of the LCD panel 30 are denoted as H and V, respectively. Using an existing 46-inch single-shorter-edge-lit LED TV as example, the 9 points' cross-talk is measured and summarized in Table 1. As can be seen from Table 1, the cross-talk is not vertically symmetric with a greater value at upper points and a smaller value at lower points. The cross-talk is also not horizontally symmetric. This is due to light is incident from a side and, as it travels farther, the leakage is more serious.

TABLE 1

Cross-talk at 9 points (46-inch, single-shorter-edge-lit, and 4 backlight partitions).

| Single-edge-lit | Left 1/9 | Middle 1/2 | Right 8/9 |
|---|---|---|---|
| Upper 1/9 | 14.99% | 8.84% | 7.03% |
| Middle 1/2 | 5.60% | 4.51% | 3.69% |
| Lower 8/9 | 8.47% | 6.20% | 4.81% |

Due to the backlight partitions, signals for the LCD panel, glasses, and the backlight module have to be time-synchronized and this often leads to asymmetric cross-talk. From the data of Table 1, for an existing 46-inch, single-shorter-edge-lit LED TV, the left- or right-eye signal has the best image quality at the center of the LCD panel and the image quality is vertically asymmetric. The vertically asymmetric cross-talk shown in Table 1 can be explained by the time sequence relationship between signals to the backlight partitions and the LCD panel. FIG. 4 is a schematic diagram showing the time-sequence relationship between signal to the backlight partitions and signal to the LCD panel (i.e., the left- or right-eye image signal to the LCD panel) of an existing 46-inch, single-shorter-edge-lit LED TV (left-eye signal). The backlight module is vertically and sequentially separated into a first backlight partition 41, a second backlight partition 42, a third backlight partition 43, and a fourth backlight partition 44, for illuminating a first display partition, a second display partition, a third display partition, and a fourth display partition of a LCD panel 40, respectively. Using the left-eye signal as example, FIG. 4 shows four consecutive steps of the LCD panel 40 and the backlight partitions illuminating the LCD panel 40. In step a, the left-eye signal from a current frame is loaded into the first to third display partitions whereas the right-eye signal from a previous frame is loaded into the fourth display partition. The first backlight partition 41 is lit to illuminate the first display partition. Since the light from the first backlight partition 41 may leak to the fourth display partition, the right-eye signal from a previous frame loaded into the fourth display partition becomes the error signal causing cross-talk with the left-eye signal from a current frame loaded into the first display partition. As the first and fourth display partitions are separated by two display partitions in between, the cross-talk is mild. In step b, the left-eye signal from a current frame is loaded into the fourth display partition and, therefore, the complete left-eye signal for the current frame is loaded into the LCD panel 40. The second backlight partition 42 is lit to illuminate the second display partition and the leakage from the second backlight partition 42 does not cause any cross-talk. As such, the image quality is the best. In step c, the right-eye signal from a next frame is loaded into the first display partition whereas the left-eye signal from a current frame is loaded into the second to fourth display partitions. The third backlight partition 43 is lit to illuminate the third display partition. The right-eye signal from a next frame loaded into the first display partition becomes the error signal causing cross-talk with the left-eye signal from a current frame loaded into the third display partition. Since the first and third display partitions are separated by a display partition in between, the cross-talk is more serious as their distance is closer. In step d, the right-eye signal from a next frame is loaded into the first and second display partitions whereas the left-eye signal from the current frame is loaded into the third and fourth display partitions. The fourth backlight partition 44 is lit to illuminate the fourth display partition. The right-eye signal from a next frame loaded into the first and second display partitions becomes the error signal causing cross-talk with the left-eye signal from the current frame loaded into the fourth display partition. Since the first and second display partitions are separated from the fourth display partition by a display partition in between, the cross-talk is more serious as their distance is closer. In the entire 3D display process, the LCD panel 40 is loaded repeatedly with the right-eye signal (previous frame), the left-eye signal (the current frame), the right-eye signal (the next frame), the left-eye signal, the right-eye signal, etc. Since the existing edge-lit backlight modules are divided into an even-numbered backlight partitions. The error signal has different impact to those display partitions above and below. In the above example, the error signal where the lit time of the backlight partition closer to the top produces greater cross-talk in the top portion of the LCD panel 40. The cross-talk of the LCD panel 40 is therefore vertically asymmetric. If the signal to the LCD panel 40 is adjusted so that the backlight partition is lit in the middle of the signal to the LCD panel, the cross-talk would become more vertically symmetric. Yet, as the number of backlight partitions is even, the image quality in the center of the LCD panel would be affected and the cross-talk is more serious.

The existing 3D displays usually use a light guide plate with a prism structure. FIGS. 5A and 5B are perspective and planar schematic diagrams showing light trajectories of an existing light guide plate with a prism structure. A conventional light guide plate 50 has a symmetric prism structure so that light beams 52 can propagate farther parallel to the prism direction 51 and achieves more total internal reflection (T.I.R.). Light beams 53 perpendicular to the prism direction 51 propagate in a confined range and T.I.R. is difficult to achieve, thereby forming a converged light pattern. FIG. 6 shows the light patterns from a flat light guide plate (left) and a light guide plate with a prism structure (right). From FIG. 6, the degree of convergence from the light guide plate with a prism structure is greater than that of the flat light guide plate.

SUMMARY OF THE INVENTION

Therefore, an objective of the present invention is to provide a novel asymmetric prism structure, a light guide plate, a backlight module, and a related application capable of producing a different light convergence pattern different from the existing light guide plate.

To achieve the objective, the asymmetric prism structure contains multiple asymmetric prisms arranged in parallel where each asymmetric prism has a first slant face, a second slant face, and a bottom face, connected end-to-end together. The first slant face directs light beams propagating perpendicular to the prism direction to a lateral side, and the second slant face directs light beams propagating perpendicular to the prism direction to the other lateral side.

For a cross-sectional triangle obtained from a plane perpendicular to the prism direction dissecting the asymmetric prism structure, the two slant faces of the asymmetric prism structure correspond to the two slant edges of the cross-sectional triangle, and the bottom face of the asymmetric prism structure corresponds to the bottom edge of the cross-sectional triangle. The cross-sectional triangle is shaped so that the projections of the two slant edges towards the bottom edge all fall within the bottom edge, and the lengths of projection $p1$ and $p2$ of the two slant edges, respectively, satisfy that $p1 > 3 \times p2$ or $p2 > 3 \times p1$.

One of the lengths of projection $p1$ and $p2$ is 0.

The present invention further provides a light guide plate whose top surface is configured with the asymmetric prism structure.

The present invention further provides a backlight module which includes the above mentioned light guide plate.

The present invention further provides a light guide plate whose top surface is configured with a symmetric prism structure and the asymmetric prism structure.

The present invention further provides a backlight module which includes the above mentioned light guide plate.

The present invention also provides an application of the asymmetric prism structure. When vertical asymmetry is present in the timing sequences for the backlight scanning and the signal to the LCD panel, the asymmetric prism structure can reduce the cross-talk near a side from the error signal, thereby enhancing the video quality.

The asymmetric prism structure, light guide plate, and backlight module of the present invention achieve a different light convergence pattern from that of existing light guide plate. When vertical asymmetry is present in the timing sequences for the backlight scanning and the signal to the LCD panel, the asymmetric prism structure, light guide plate, and backlight module of the present invention can reduce the cross-talk near a side from the error signal, thereby enhancing the video quality, by the asymmetric prism structure.

BRIEF DESCRIPTION OF THE DRAWINGS

To make the technical solution of the embodiments according to the present invention, a brief description of the drawings that are necessary for the illustration of the embodiments will be given as follows. Apparently, the drawings described below show only example embodiments of the present invention and for those having ordinary skills in the art, other drawings may be easily obtained from these drawings without paying any creative effort. In the drawings.

DETAILED DESCRIPTION OF THE PREFERRED EMBODIMENTS

Figure 7A:
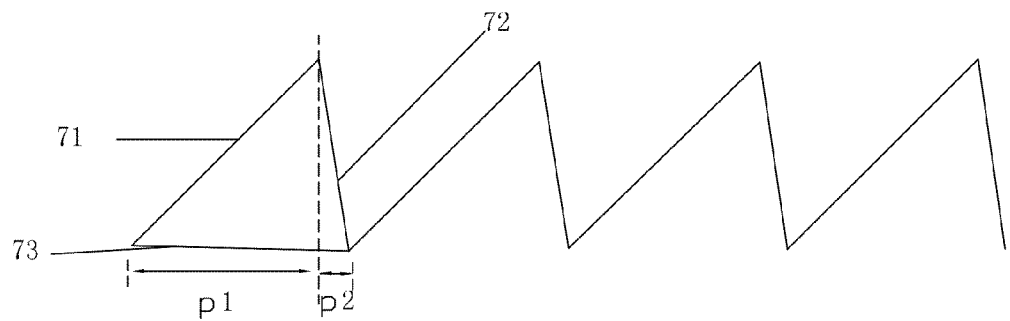
FIG. 7A is a structural schematic diagram showing an asymmetric prism structure according to a preferred embodiment of the present invention.

FIG. 7A is a schematic diagram showing an asymmetric prism structure according to a preferred embodiment of the present invention. As illustrated, the asymmetric prism structure has a first slant face, a second slant face, and a bottom face, connected end-to-end together. For light beams propagating perpendicular to the prism direction, the first slant face directs its incident light beams towards a lateral side, and the second slant face directs its incident light beams towards another lateral side, of the asymmetric prism structure. For a cross-sectional triangle obtained from a plane perpendicular to the prism direction dissecting the asymmetric prism structure, the two slant faces of the asymmetric prism structure correspond to the two slant edges 71 and 72 of the cross-sectional triangle, and the bottom face of the asymmetric prism structure corresponds to the bottom edge 73 of the cross-sectional triangle. The cross-sectional triangle is shaped so that the projections of the two slant edges 71 and 72 towards the bottom edge 73 all fall within the bottom edge 73. The lengths of projection p1 and p2 of the two slant edges 71 and 72, respectively, satisfy that p1>3×p2 or p2>3×p1.

Figure 7B:
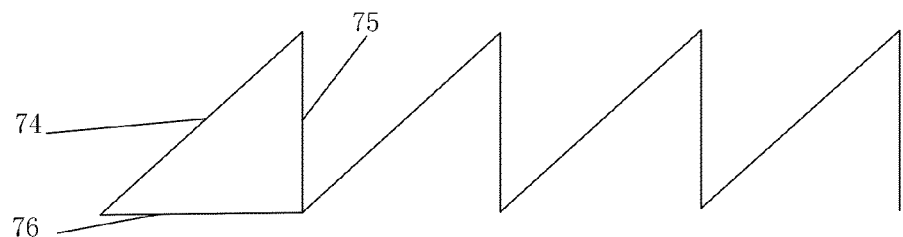
FIG. 7B is a structural schematic diagram showing an asymmetric prism structure according to another preferred embodiment of the present invention.

FIG. 7B is a schematic diagram showing an asymmetric prism structure according to another preferred embodiment of the present invention. As illustrated, the cross-section triangle is a right-angled triangle and the asymmetric prism structure's two faces correspond to the slant and vertical edges 74 and 75 of the right-angled triangle. The projection of the slant edge 74 towards the bottom edge 76 is exactly the bottom edge 76. For the cross-sectional triangle shown in FIG. 7A, it becomes what is shown in FIG. 7B when either p1 or p2 is zero.

Figure 8A:
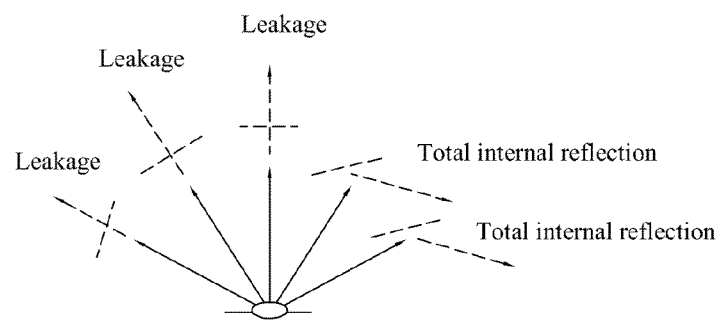
FIG. 8A is a planar schematic diagram showing light trajectories of a light guide plate incorporating the asymmetric prism structure of the present invention.
Figure 8B:
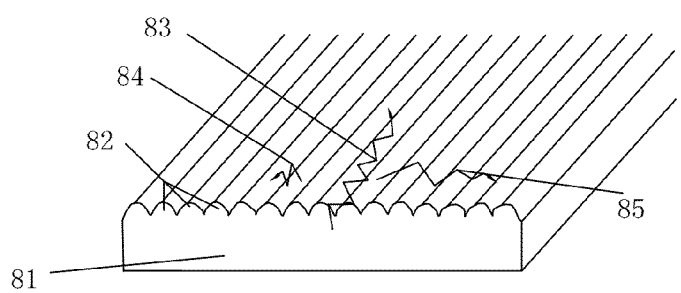
FIG. 8B is a perspective schematic diagram showing light trajectories of a light guide plate incorporating the asymmetric prism structure of the present invention.

The present invention also provides a light guide plate whose top surface is configured with the above described asymmetric prism structure. The present invention also provides a backlight module which includes the just mentioned light guide plate. FIG. 8A is a planar schematic diagram showing light trajectories of a light guide plate incorporating the asymmetric prism structure of the present invention. FIG. 8B is a perspective schematic diagram showing light trajectories of a light guide plate incorporating the asymmetric prism structure of the present invention. As illustrated in FIG. 8A, for light beams propagating perpendicular to the prism direction, the first slant face directs its incident light beams towards a lateral side mainly in the form of total internal reflection (T.I.R.), and the second slant face directs its incident light beams towards another lateral side mainly in the form of leakage, of the asymmetric prism structure. As illustrated in FIG. 8B, due to the asymmetric prism structure 82 on the light guide plate 81, the light beams 83 propagating parallel to the asymmetric prism structure 82 can propagate for a longer distance and achieve T.I.R. more easily. At a lateral side, for light beams propagating perpendicular to the prism direction, their propagation is confined, thereby achieving a converged light pattern. At the other lateral side, for light beams propagating perpendicular to the prism direction, their propagation is extended, in contrast to the conventional symmetric prism structure. The light guide plate 81 of the present invention has a converged light pattern at one lateral side, and a diverged light pattern at the other lateral side.

The present invention further provides a light guide plate whose top surface is configured with a conventional symmetric prism structure and the above described asymmetric prism structure. The present invention also provides a backlight module which includes the just mentioned light guide plate.

Figure 1:
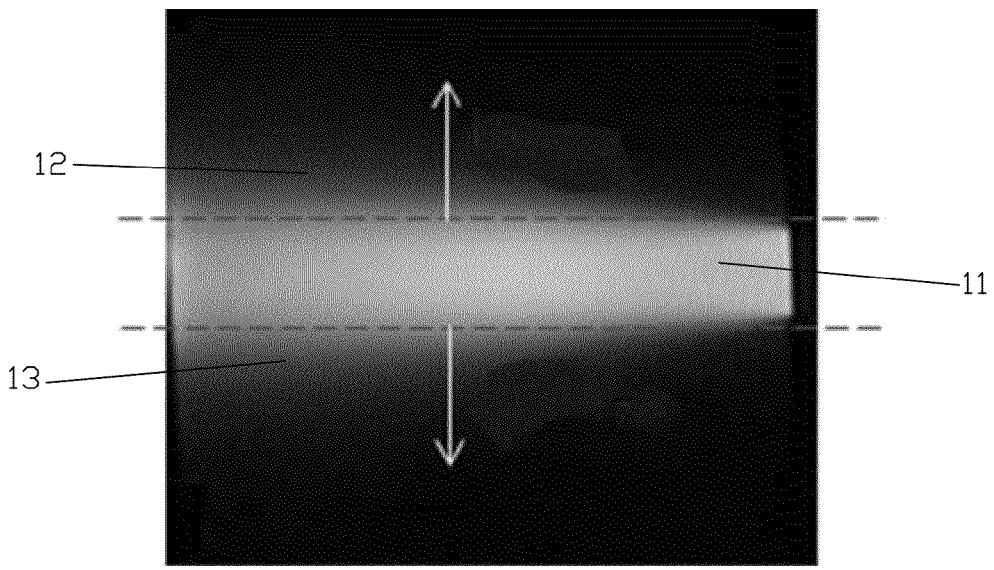
FIG. 1 is a schematic diagram showing the partitioned illumination and leakage of an edge-lit LED backlight.
Figure 2A:
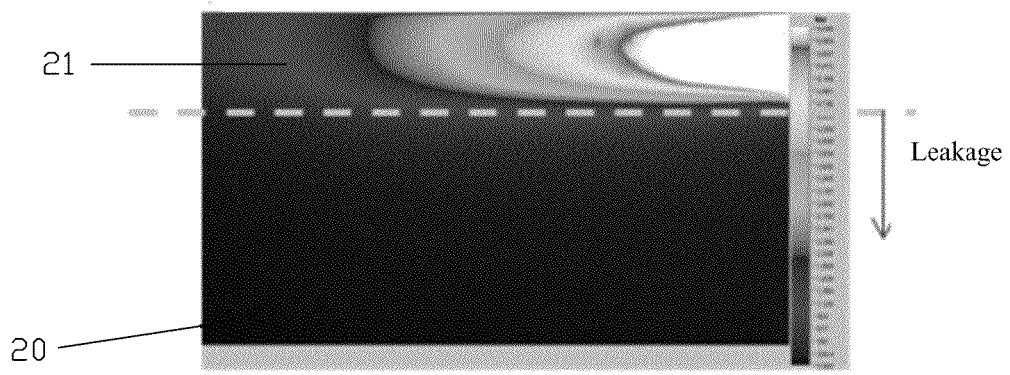
FIGS. 2A and 2B are schematic diagrams showing the illumination of the backlight partitions of an existing 46-inch single-shorter-edge-lit LED TV.
Figure 2B:
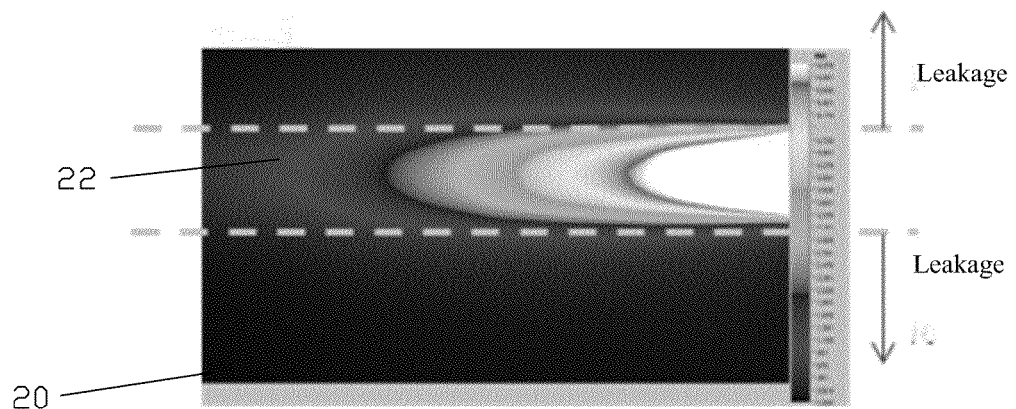
Figure 3:
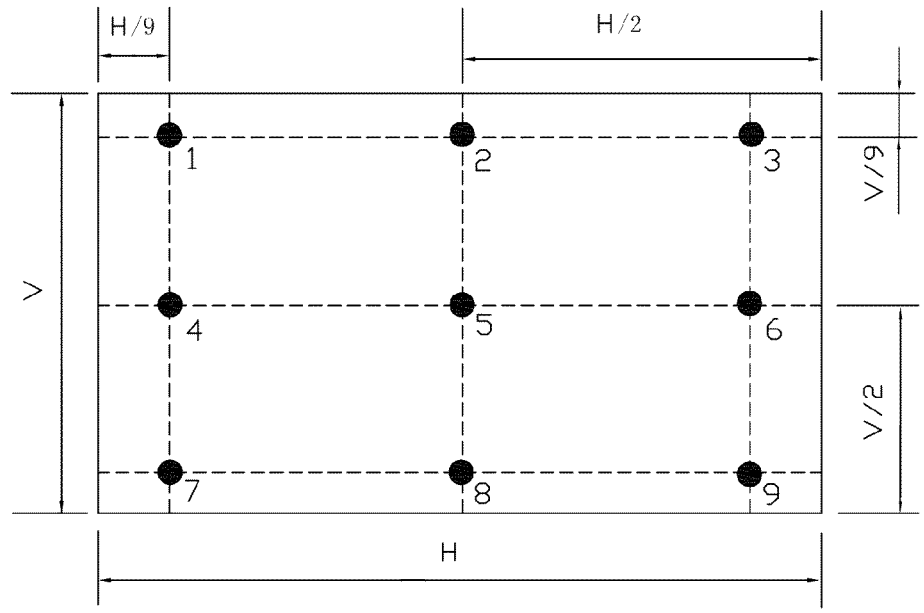
FIG. 3 is a schematic diagram showing the measurement of cross-talk among 9 points on a LCD panel.
Figure 4:
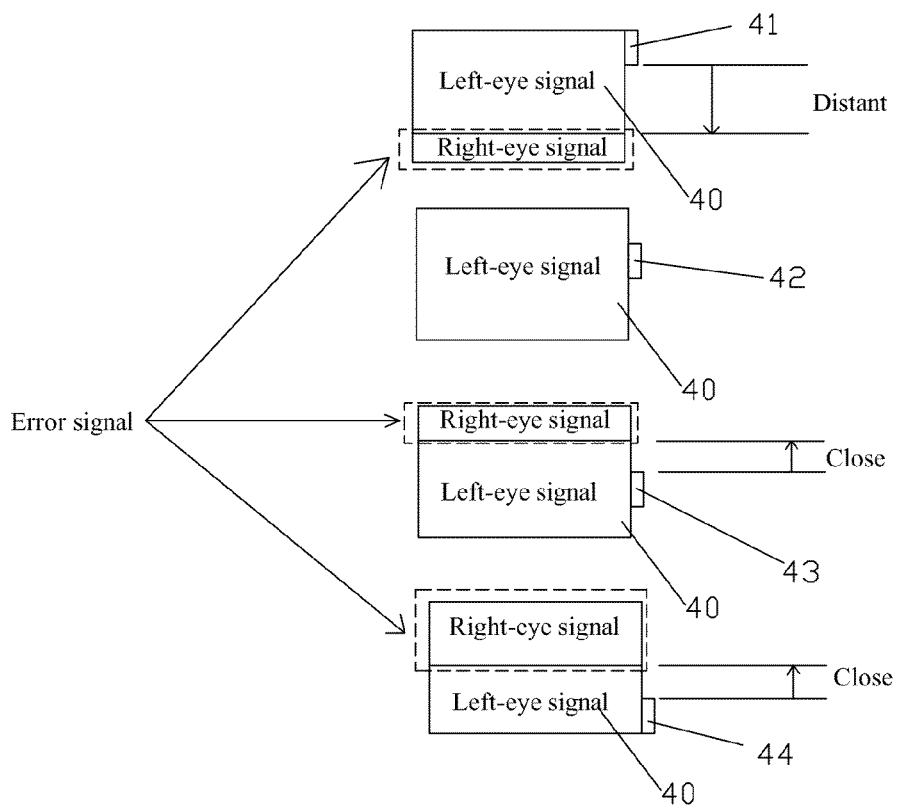
FIG. 4 is a schematic diagram showing the time-sequence relationship between signal to the backlight partitions and signal to the LCD panel (i.e., the left- or right-eye image signal to the LCD panel) of an existing 46-inch, single-shorter-edge-lit LED TV (left-eye signal)
Figure 5A:
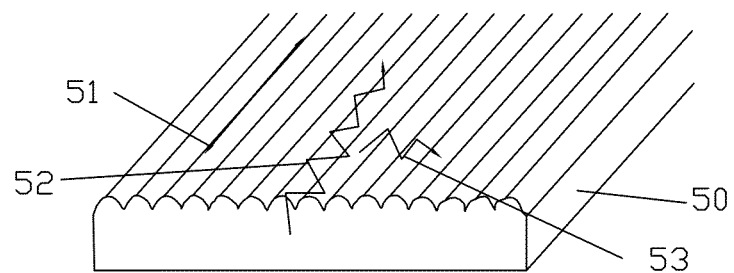
FIGS. 5A and 5B are perspective and planar schematic diagrams showing light trajectories of an existing light guide plate with a prism structure.
Figure 5B:
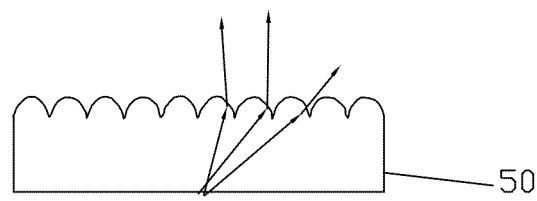
Figure 6:
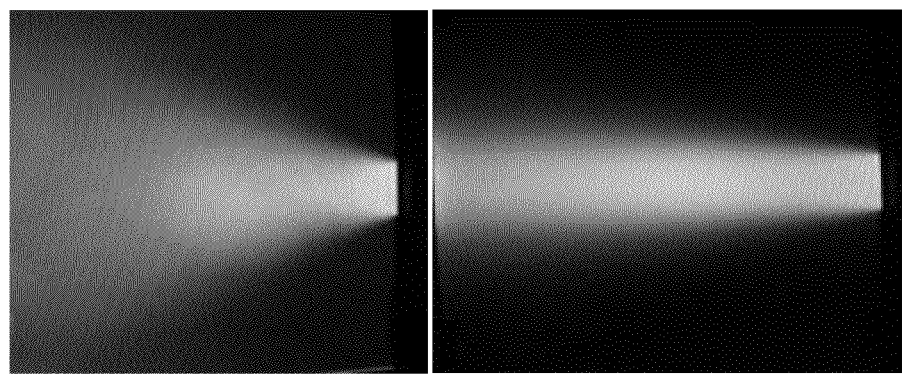
FIG. 6 shows the light patterns from a flat light guide plate (left) and a light guide plate with a prism structure (right)

The present invention also provides an application of the above mentioned asymmetric prism structure. For an application similar to what is shown in FIG. 4 where vertical asymmetry is present in the timing sequences for the backlight scanning and the signal to the LCD panel, the asymmetric prism structure can reduce the cross-talk near a side from the error signal, thereby enhancing the video quality.

In summary, the asymmetric prism structure, light guide plate, and backlight module of the present invention achieve a different light convergence pattern from that of existing light guide plate. When vertical asymmetry is present in the timing sequences for the backlight scanning and the signal to the LCD panel, the asymmetric prism structure, light guide plate, and backlight module of the present invention can reduce the cross-talk near a side from the error signal, thereby enhancing the video quality, by the asymmetric prism structure.

Embodiments of the present invention have been described, but not intending to impose any unduly constraint to the appended claims. Any modification of equivalent structure or equivalent process made according to the disclosure and drawings of the present invention, or any application thereof, directly or indirectly, to other related fields of technique, is considered encompassed in the scope of protection defined by the clams of the present invention.

What is claimed is:

1. An asymmetric prism structure comprising a plurality of asymmetric prisms arranged in parallel wherein each asymmetric prism has a first slant face, a second slant face, and a bottom face, connected end-to-end together; the first slant face directs light beams propagating perpendicular to the prism direction to a lateral side; the second slant face directs light beams propagating perpendicular to the prism direction to the other lateral side; for a cross-sectional triangle obtained from a plane perpendicular to the prism direction dissecting the asymmetric prism structure, the two slant faces of the asymmetric prism structure correspond to the two slant edges of the cross-sectional triangle, and the bottom face of the asymmetric prism structure corresponds to the bottom edge of the cross-sectional triangle; the cross-sectional triangle is shaped so that the projections of the two slant edges towards the bottom edge all fall within the bottom edge; and the lengths of projection p1 and p2 of the two slant edges, respectively, satisfy that p1>3×p2 or p2>3×p1.

2. The asymmetric prism structure as claimed in claim 1, wherein either p1 or p2 is 0.

3. A light guide plate comprising an asymmetric prism structure as claimed in claim 1 on a top surface of the light guide plate.

4. A light guide plate comprising a symmetric prism structure and the asymmetric prism structure as claimed in claim 1 on a top surface of the light guide plate.

5. A backlight module comprising a light guide plate as claimed in claim 3.

6. A backlight module comprising a light guide plate as claimed in claim 4.

* * * * *